United States Patent
Han

(10) Patent No.: US 12,455,834 B1
(45) Date of Patent: Oct. 28, 2025

(54) EFFICIENT CACHE EVICTION

(71) Applicant: SAP SE, Walldorf (DE)

(72) Inventor: Bing Han, Shanghai (CN)

(73) Assignee: SAP SE, Walldorf (DE)

( * ) Notice: Subject to any disclaimer, the term of this patent is extended or adjusted under 35 U.S.C. 154(b) by 7 days.

(21) Appl. No.: 18/650,417

(22) Filed: Apr. 30, 2024

(51) Int. Cl.
*G06F 12/12* (2016.01)
*G06F 12/123* (2016.01)

(52) U.S. Cl.
CPC ................... *G06F 12/123* (2013.01)

(58) Field of Classification Search
CPC ................ G06F 12/12; G06F 12/123
See application file for complete search history.

(56) References Cited

U.S. PATENT DOCUMENTS

| | | | |
|---|---|---|---|
| 11,586,546 B2* | 2/2023 | Lieber | G06F 12/126 |
| 2002/0152361 A1 | 10/2002 | Dean et al. | |
| 2006/0149757 A1 | 7/2006 | Bird et al. | |
| 2006/0282620 A1 | 12/2006 | Kashyap et al. | |
| 2007/0198779 A1 | 8/2007 | Wang | |
| 2010/0281218 A1 | 11/2010 | Shen et al. | |
| 2011/0145506 A1 | 6/2011 | Cherukuri et al. | |
| 2019/0205254 A1* | 7/2019 | Yochai | G06F 12/0888 |
| 2020/0097412 A1* | 3/2020 | Chakra | G06F 12/0862 |
| 2022/0075782 A1* | 3/2022 | Hines | G06F 16/211 |
| 2022/0121717 A1* | 4/2022 | Mytych | G06Q 30/0631 |
| 2023/0110007 A1* | 4/2023 | Oberhofer | G06F 16/24578 707/728 |

OTHER PUBLICATIONS

T. Priovolos, S. Maroulis and V. Kalogeraki, "ESCAPe: Elastic Caching for Big Data Systems," 2019 38th Symposium on Reliable Distributed Systems (SRDS), Lyon, France, 2019, pp. 93-102.*

\* cited by examiner

*Primary Examiner* — Pierre Michel Bataille
(74) *Attorney, Agent, or Firm* — SCHWEGMAN LUNDBERG & WOESSNER, P.A.

(57) ABSTRACT

A processor or other cache manager may be configured to perform eviction of data from a cache memory. The processor detects a request to store a first data record into the cache memory. The request includes the first data record and a first weight, which may be specified by an application. The processor writes the first data record and its first weight into the cache memory. The processor calculates a first score of the first data record, which may be based on a first ratio of a first idle time of the first data record to the first weight. The processor compares the first score to a second score of a second data record stored in the cache memory. The processor then deletes the first data record from the cache memory, based on the comparing of the first score to the second score.

20 Claims, 5 Drawing Sheets

EFFICIENT CACHE EVICTION

TECHNICAL FIELD

The subject matter disclosed herein generally relates to the technical field of cache management, such as processor cache memory management or other forms of managing cache memory for (e.g., in) one or more processors (e.g., microprocessors). Specifically, the present disclosure addresses systems and methods to facilitate eviction of data from a cache memory.

BACKGROUND

In some systems, a Least Recently Used (LRU) approach manages a cache memory by using idle times since data records in the cache memory were last accessed to determine which data record is to be evicted when the cache memory is full. In other systems, a Least Frequently Used (LFU) approach manages a cache memory by using access frequencies (e.g., access counts over time) of data records to determine which data record is to be evicted when the cache memory is full.

BRIEF DESCRIPTION OF THE DRAWINGS

Some embodiments are illustrated by way of example and not limitation in the figures of the accompanying drawings.

DETAILED DESCRIPTION

Figure 1:
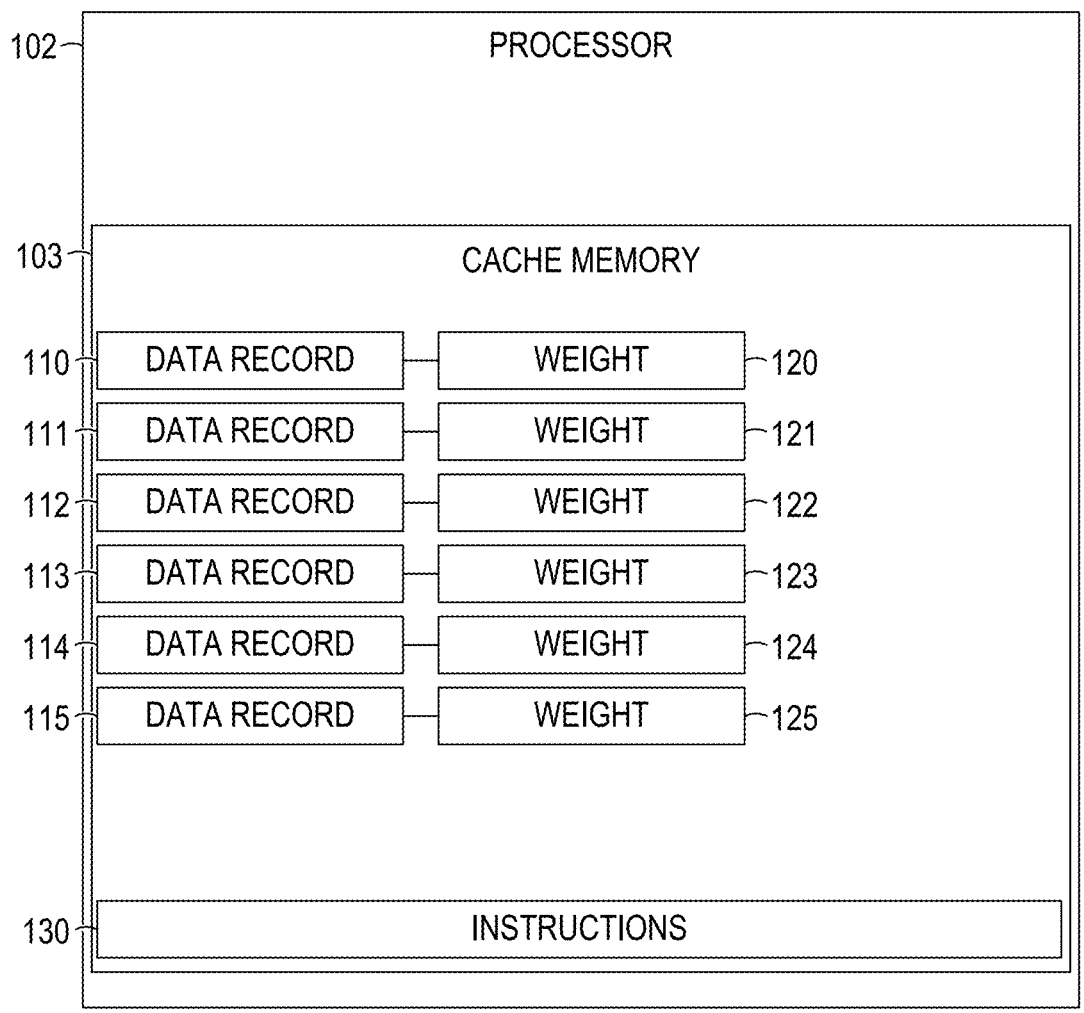
FIG. 1 is a hardware component diagram illustrating a processor with a cache memory, according to some example embodiments.

Example methods (e.g., algorithms) facilitate eviction of data from a cache memory (e.g., cache eviction), and example systems (e.g., special-purpose machines configured by special-purpose software) are configured to facilitate eviction of data from a cache memory. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided. In the following description, for purposes of explanation, numerous specific details are set forth to provide a thorough understanding of various example embodiments. It will be evident to one skilled in the art, however, that the present subject matter may be practiced without these specific details.

An LRU approach to cache management may subtract idle times from temporal offsets to determine which data record is to be deleted (e.g., evicted) from a cache memory when the cache memory is full. A score may be calculated for a given data record using the following equation, where T is a temporal offset (e.g., indicative of relative importance of the data record) and t is time.

$$\text{Score} = T - t \tag{1}$$

In such systems, at a particular time, the data record with lowest score is selected for eviction, if the cache memory is full and a new data record needs to be stored in the cache memory.

As an example, the following table illustrates a simple cache that can store only two data records at a time. One data record, Record A, has a temporal offset T=5 (e.g., indicating high importance), and the other data record, Record B, has a temporal offset T=3 (e.g., indicating less importance). The table shows which of the two data records would be evicted if a third data record needs to be written into the cache memory:

TABLE 1

| Time (ms) | Record A (T = 5) | Record B (T = 3) |
|---|---|---|
| 0 | 5 | — |
| 1 | 4 | 3 |
| 2 | 3 | 2 |
| 3 | 2 | 1 |
| 4 | 1 | 0 |
| 5 | 0 | 0 |

From the example shown in Table 1, Record B is staggered behind Record A by 1 ms, and thus the scores of each record is decreased by 1 ms as time progresses. Thus, if a third record, Record C, is to be stored in (e.g., written into) this cache memory at time t=2, t=3, or t=4, Record B would have the lowest score and accordingly be evicted from the cache memory to make room for Record C.

Furthermore, as shown in Table 1, at time t=5, a minimum score of zero is imposed. Specifically, Record B's score is capped at 0 and does not decrease further to −1, −2, etc. As a result, a tie breaker protocol would be used from that time onward, because both records have the same score for purposes of deciding which record to evict. In general, however, it is not necessary to implement a minimum score.

The scenario shown in Table 1 demonstrates how the staggered times at which the two data records were written into the cache memory are more of an influence on the eviction policy than the temporal offsets for the two data records. Record B is always evicted when the difference in temporal offsets is greater than the difference in times of entry into the cache memory. In other words, if Record B entered into the cache memory at time t=3, when Record A's score is 2, then at time t=4, Record B would have a score of 2, and Record A would have a score 1, such that Record A would be evicted to make room for new Record C at time t=4.

The processors, cache managers, systems, methods, and software discussed herein provide, inter alia, cache management (e.g., cache eviction) approaches that are more efficient than plain LRU or plain LFU approaches, in accordance with various example embodiments.

According to some example embodiments, a processor may be configured (e.g., by suitable hardware, software, or a combination of both) to efficiently perform eviction of data from a cache memory. As configured, the processor detects a request from an application to store a first data record into a cache memory of the processor. The request includes the first data record and a corresponding first weight specified for the first data record by the application. The processor writes (e.g., stores) the first data record and its corresponding first weight into the cache memory of the processor. The processor then calculates a first score of the first data record, based on a first ratio of a first idle time since the first data record was last accessed to the corresponding first weight specified by the application. The processor may calculate the first score multiple times as the cache memory is used by the processor for various operations. The processor compares the first score of the first data record to a second score of a second data record stored in the cache memory of the processor. The second score was calculated (e.g., by the same processor) based on a second ratio of a second idle time since the second data record was last accessed to a corresponding second weight (e.g., of the second data record). The processor may repeatedly compare recalculated instances of the first score to recalculated instances of the second score as the cache memory is used by the processor for various operations. The processor then deletes (e.g., evicts) the first data record from the cache memory of the processor, based on the comparing of the first score of the first data record to the second score of the second data record stored in the cache memory of the processor.

Thus, in such example embodiments, a score for a data record may be calculated using the following equation, where W is a weight (e.g., indicative of relative importance of the data record) and t is time.

$$\text{Score} = t/W \qquad (2)$$

In such example embodiments, at a particular time, the data record with the highest score is selected for eviction, if the cache memory is full and a new data record needs to be stored in the cache memory.

As an example, the following table illustrates a simple cache that can store only two data records at a time. One data record, Record A, has a weight W=5 (e.g., indicating high importance), and the other data record, Record B, has a weight W=3 (e.g., indicating less importance). The table shows which of the two data records would be evicted if a third data record needs to be written into the cache memory:

TABLE 2

| Time (ms) | Record A (W = 5) | Record B (W = 3) |
|---|---|---|
| 0 | 0 | — |
| 1 | 0.2 | 0 |
| 2 | 0.4 | 0.33 |
| 3 | 0.6 | 0.66 |
| 4 | 0.8 | 1.0 |
| 5 | 1.0 | 1.0 |

From the example shown in Table 2, the stagger time between the entries of Record A and Record B is not as influential, compared to the example shown in Table 1. In contrast, at time t=2, if a new Record C is to be added to the cache memory, Record A would be evicted, since it has a higher score than Record B. However, if Record C is to be added to the cache memory at time t=3 or t=4, Record B would be evicted, as it has a higher score than Record A.

Furthermore, as shown in Table 2, at time t=5, a maximum score is imposed. Specifically, Record B's score is capped at 1 and does not increase further to be greater than 1. As a result, a tie breaker protocol would be used from that time onward, because both records have the same score for purposes of deciding which record to evict. In general, however, it is not necessary to implement a maximum score. Additional options for various implementations of such example embodiments include: quantizing weights, select-ing weights based on a category of the data record or the application that requested caching of the data record, or any suitable combination thereof.

According to other example embodiments, the processor detects a request from an application to store a first data record into a cache memory of the processor. The request includes the first data record and a corresponding first weight specified for the first data record by the application. The processor writes the first data record and its corresponding first weight into the cache memory of the processor. The processor calculates a first score of the first data record, based on a first product of a first access frequency (e.g., access counts divided by time) of the first data record times the corresponding first weight specified by the application. The processor may calculate the first score multiple times as the cache memory is used by the processor for various operations. The processor compares the first score of the first data record to a second score of a second data record stored in the cache memory of the processor. The second score was calculated (e.g., by the same processor) based on a second product of a second access frequency of the second data record times a corresponding second weight. The processor may repeatedly compare recalculated instances of the first score to recalculated instances of the second score as the cache memory is used by the processor for various operations. The processor then deletes the first data record from the cache memory of the processor, based on the comparing of the first score of the first data record to the second score of the second data record stored in the cache memory of the processor.

Thus, in such example embodiments, a score for a data record may be calculated using the following equation, where W is a weight (e.g., indicative of relative importance of the data record) and f is a frequency at which the data record is accessed.

$$\text{Score} = f \times W \qquad (3)$$

In such example embodiments, at a particular time, the data record with the lowest score is selected for eviction, if the cache memory is full and a new data record needs to be stored in the cache memory. Additional options for various implementations of such example embodiments include: capping scores, quantizing weights, selecting weights based on a category of the data record or the application that requested caching of the data record, or any suitable combination thereof.

FIG. 1 is a hardware component diagram illustrating a processor 102 with a cache memory 103, according to some example embodiments. The cache memory 103 of the processor 102 may be managed by the processor 102, by a separate cache manager (e.g., onboard the processor 102 or elsewhere communicatively coupled to the cache memory 103), or any suitable combination thereof. The processor 102 may manage the cache memory 103, for example, by executing instructions 130 that are stored in the cache memory 103, elsewhere within the processor 102, or any suitable combination thereof.

As shown in FIG. 1, the cache memory 103 stores one or more data records 110, 111, 112, 113, 114, and 115, each one mapped, linked, or otherwise associated with a corresponding weight. Thus, the data record 110 (e.g., a first data record) is stored with its corresponding weight 120 (e.g., a first weight); the data record 111 (e.g., a second data record) is stored with its corresponding weight 121 (e.g., a second weight); the data record 112 (e.g., a third data record) is stored with its corresponding weight 122 (e.g., a third weight); the data record 113 (e.g., a fourth data record) is stored with its corresponding weight 123 (e.g., a fourth weight); the data record 114 (e.g., a fifth data record) is stored with its corresponding weight 124 (e.g., a fifth weight); and the data record 115 (e.g., a sixth data record) is stored with its corresponding weight 125 (e.g., a sixth weight). The weights 120-125 of the data records 110-115 may be utilized as described above with respect to Equation 2, Equation 3, or both.

Figure 2:
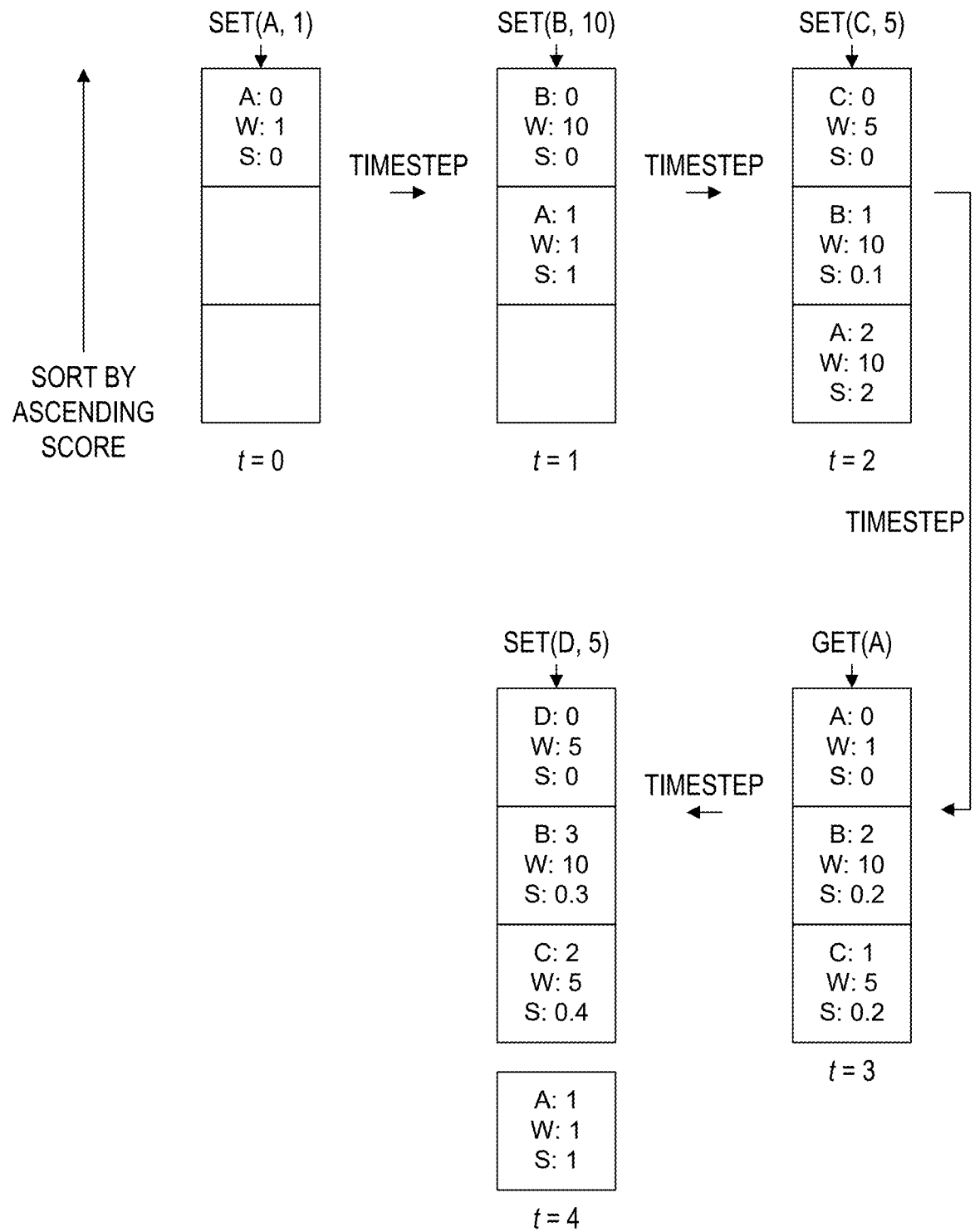
FIG. 2 is a state diagram illustrating a cache memory over multiple timesteps, according to some example embodiments.

FIG. 2 is a state diagram illustrating a cache memory over multiple timesteps, using Equation 2 discussed above, according to some example embodiments. In a first state (1=0), shown in the upper left portion of FIG. 2, Record A with weight W=1 (e.g., indicating low importance) is written (e.g., with a "set" command) to the cache memory. The idle time of Record A at this point is 0 timesteps (e.g., seconds, milliseconds, microseconds, etc.). As a result, the score for Record A is 0.

In a second state, after one timestep (t=1), Record B with weight W=10 (e.g., indicating high importance) is written to the cache memory. The idle time of Record B at this point is 0 timesteps. Thus, the score for Record B is 0. At the same point, Record A's idle time has increased to 1 timestep, and as a result, the score for Record A is 1.

In a third state, after another timestep (t=2), Record C with weight W=5 (e.g., indicating medium importance) is written to the cache memory. The idle time of Record C at this point is 0 timesteps, and the score for Record C is thus 0. At the same point, the idle time of Record B has increased to 1 timestep, and the score for Record B is now 0.1. Further at the same point, the idle time for Record A has increased to 2 timesteps, and the resulting score for Record A is 2.

In a fourth state, after a further timestep (1=3), Record A is accessed (e.g., with a "get" command), causing Record A's idle time to be reset to 0 timesteps, and the score for Record A becomes 0. Meanwhile, the idle times for Records B and C have each increased by 1 timestep. As a result, the score for Record B is 0.2, and the score for Record C is 0.2.

In a fifth state, after a yet further timestep (t=4), Record D with weight W=5 is written to the cache memory. The cache memory is full, and as a consequence, a data record is to be evicted (e.g., dropped or deleted) from the cache memory. At this point, the score for Record A is 1, which is the lowest score. Record B's score is 0.3, and Record C's score is 0.4. Thus, Record A is evicted to make room for Record D, leaving the more highly weighted (e.g., more important) Records B and C remaining in the cache memory.

Figure 3:
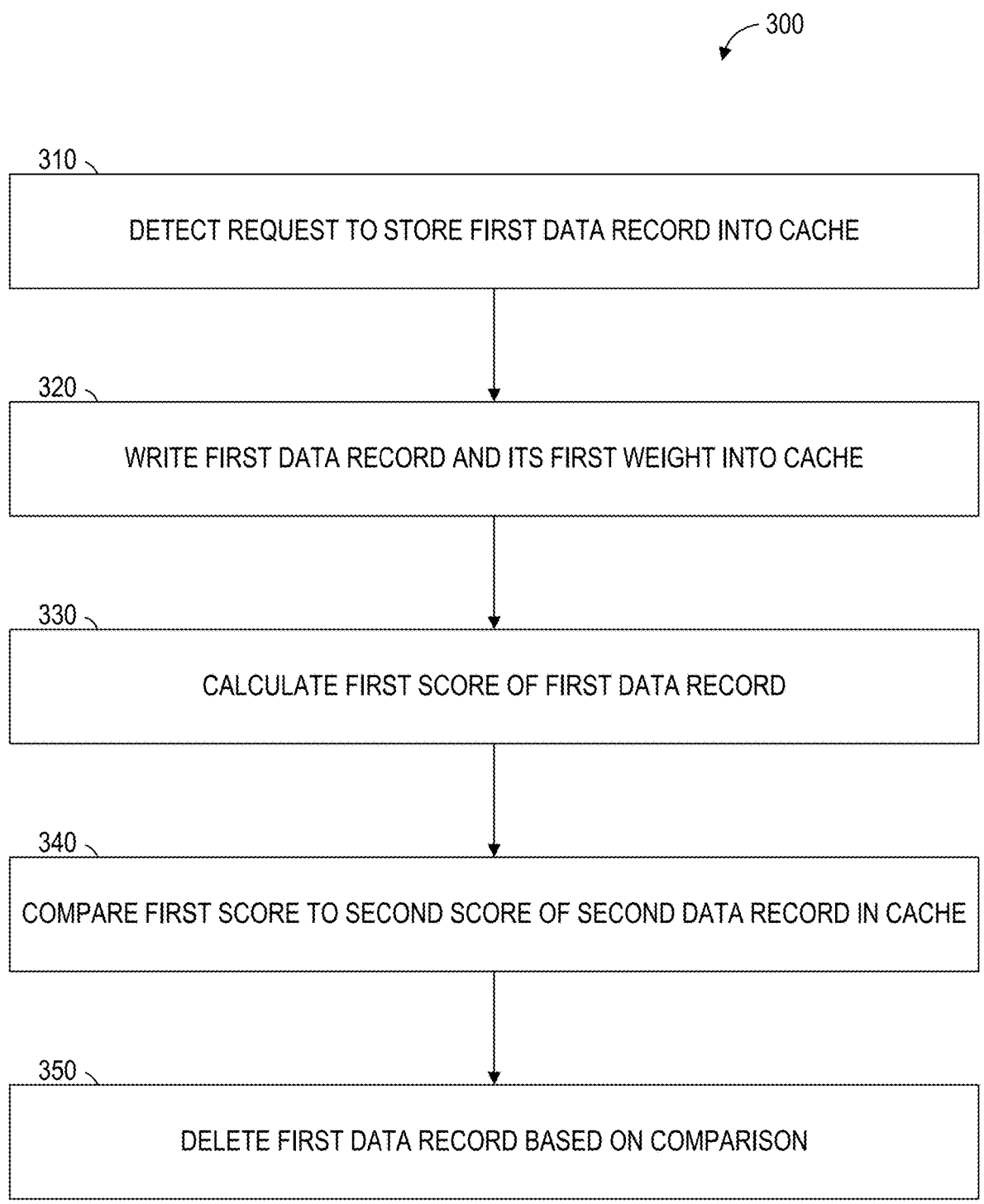
FIGS. 3 and 4 are flowcharts illustrating operations of a processor or other cache manager in performing a method of evicting a data record from a cache memory, according to some example embodiments.
Figure 4:
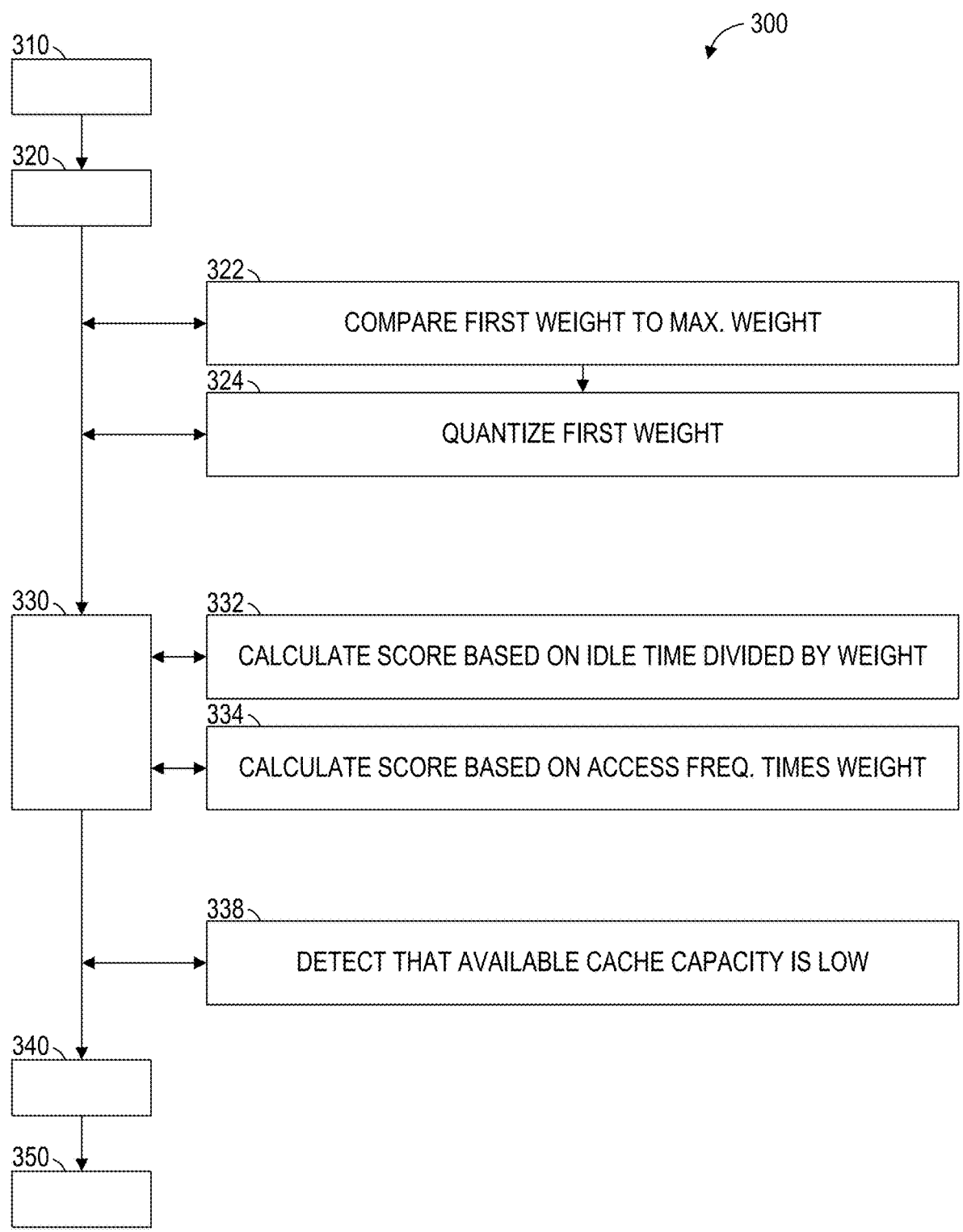

FIGS. 3 and 4 are flowcharts illustrating operations of a processor (e.g., processor 102) or other cache manager in performing a method 300 of evicting a data record from a cache memory (e.g., cache memory 103), according to some example embodiments. As shown in FIG. 3, the method 300 includes operations 310, 320, 330, 340, and 350.

In operation 310, the processor or other cache manager detects a request (e.g., an Application Programming Interface (API) request) from an application (e.g., being executed by the processor) to store a first data record into a cache memory of the processor. The detected request includes the first data record and a corresponding first weight specified for the first data record by the application. In some example embodiments, the application specified the first weight based on a first size of the first data record. In certain example embodiments, the application specified the first weight based on a first data category of the first data record among a plurality of data categories. In various example embodiments, the first weight specified by the application is a positive integer value.

In operation 320, the processor or other cache manager writes or otherwise stores the first data record and its corresponding first weight into the cache memory of the processor. This can occur if there is a vacancy already in the cache (e.g., it is getting filled) or if another data record was evicted to make room to write or store this first data record.

In operation 330, the processor or other cache manager calculates a first score of the first data record. According to some example embodiments, the calculating of the first score is based on a first ratio of a first idle time since the first data record was last accessed to the corresponding first weight specified by the application (e.g., based on the first size of the first data record, the first data category of the first data record, or both). According to certain example embodiments, the calculating of the first score is based on a first product of a first access frequency of the first data record times the corresponding first weight specified by the application (e.g., based on the first size of the first data record, the first data category of the first data record, or both).

In operation 340, the processor or other cache manager compares the first score of the first data record to a second score of a second data record stored in the cache memory of the processor. In those example embodiments where the first score was calculated based on the first ratio of the first idle time to the first weight specified by the application, the second score that is used for comparison here is calculated based on a second ratio of a second idle time since the second data record was last accessed to a corresponding second weight. In those example embodiments where the first score was calculated based on the first product of the first access frequency of the first data record times the first weight specified by the application, the second score that is used for comparison here is calculated based on a second product of a second access frequency of the second data record times a corresponding second weight.

In operation 350, the processor or other cache manager deletes the first data record from the cache memory of the processor based on the comparing of the first score of the first data record to the second score of the second data record stored in the cache memory of the processor. In example embodiments where the first score was calculated based on the first ratio of the first idle time to the first weight specified by the application, the deleting of the first data record may be based on the first ratio that corresponds to the first data record exceeding the second ratio that corresponds to the second data record. In example embodiments where the first score was calculated based on the first product of the first access frequency of the first data record times the first weight specified by the application, the deleting of the first data record may be based on the second product that corresponds to the second data record exceeding the first product that corresponds to the first data record.

As shown in FIG. 4, in addition to any one or more of the operations previously described, the method 300 may include one or more of operations 322, 324, 332, 334, and 338. One or both of operations 322 and 324 may be performed at any point prior to performance of operation 330, in which the first score of the first data record is calculated. For example, one or both of operations 322 and 324 may be performed at any point in between operation 310, in which the request to store the first data record is detected, and operation 330.

Operation 322 may be performed in implementations where the first weight was specified by the application based on the first size of the first data record. Such an application may be configured to assign, accord, or otherwise specify different weights to different sizes of data records. To facilitate situations where different applications may specify a wide range of different weights, where some may be arbitrarily high weight for some data records, the processor or other cache manager may impose a cap (e.g., a maximum weight) by limiting any specified weight that is above the cap (e.g., by clamping or otherwise modifying it to be the maximum weight). In operation 322, the processor or other cache manager compares a maximum weight to the first weight specified by the application based on the first size of the first data record. Subsequently, in operation 330, the calculating of the first score may be based on the first weight failing to exceed the maximum weight. That is, based on the first weight failing to exceed the maximum weight, operation 330 may be performed based on the first ratio of the first idle time to the first weight that was specified based on the first size of the first data record.

In operation 324, the processor or other cache manager quantizes (e.g., by rounding, bit reduction, thresholding, capping, or any suitable combination thereof) the first weight specified by the application (e.g., based on the first size of the first data record). This may be beneficial for increasing computational consistency in situations where different applications can specify different weights, but where certain ranges of arbitrary weights result in consistent behaviors from the processor or other cache manager. As an example, a data record may be assigned a first weight by a first application, but a second application may assign a second, different weight to the same data record. Subsequently, in operation 330, the calculating of the first score may be based on the first ratio of the first idle time to the quantized first weight.

One or both of operations 332 and 334 may be performed as part (e.g., a subroutine, a precursor task, a subroutine, or a portion) of operation 330, in which the first score of the first data record is calculated.

In operation 332, the processor or other cache manager calculates the first score based on a first ratio of a first idle time since the first data record was last accessed to the corresponding first weight specified by the application or as determined in one or both of operations 322 and 324. The first weight of the first data record may be determined or otherwise specified by the application based on the first size of the first data record, the first data category of the first data record, or both.

In operation 334, the processor or other cache manager calculates the first score based on a first product of a first access frequency of the first data record times the corresponding first weight specified by the application or as determined in one or both of operations 322 and 324. The first weight of the first data record may be determined or otherwise specified by the application based on the first size of the first data record, the first data category of the first data record, or both.

Operation 338 may be performed at any point prior to operation 340, in which the first score of the first data record is compared to the second score of the second data record. In operation 338, the processor or other cache manager detects that an available storage capacity of the cache memory is below a threshold value. Subsequently, in operation 340, the comparing of the first score of the first data record to the second score of the second data record may be responsive to the detection that the available storage capacity of the cache memory is below the threshold value.

According to various example embodiments, one or more of the methodologies described herein may facilitate deletion (e.g., eviction) of data (e.g., one or more data records) from a cache memory. Moreover, one or more of the methodologies described herein may facilitate efficient management of limited space in one or more cache memories. Hence, one or more of the methodologies described herein may facilitate efficient cache performance, processor performance, application performance, or any suitable combination thereof, compared to capabilities of pre-existing processors, cache managers, systems, methods, and software.

When these effects are considered in aggregate, one or more of the methodologies described herein may obviate a need for certain efforts or resources that otherwise would be involved in deletion of data from a cache memory, improving cache performance, improving processor performance, or improving application performance. Efforts expended by a user in improving processor performance, application performance, system performance, or any suitable combination thereof, may be reduced by use of (e.g., reliance upon) a special-purpose machine, such as a special-purpose processor, that implements one or more of the methodologies described herein. Computing resources used by one or more processors may similarly be reduced (e.g., compared to processors that lack the structures discussed herein or are otherwise unable to perform the functions discussed herein). Examples of such computing resources include processor cycles, computational capacity, cache memory usage, power consumption, and cooling capacity.

Any of the systems or machines discussed herein may be, include, or otherwise be implemented in a special-purpose (e.g., specialized or otherwise non-conventional and non-generic) computer that has been modified to perform one or more of the functions described herein for that system or machine (e.g., configured or programmed by special-purpose software, such as one or more software modules of a special-purpose application, operating system, firmware, middleware, or other software program). For example, a special-purpose computer system able to implement any one or more of the methodologies described herein is discussed below with respect to FIG. 5, and such a special-purpose computer may accordingly be a means for performing any one or more of the methodologies discussed herein. Within the technical field of such special-purpose computers, a special-purpose computer that has been specially modified (e.g., configured by special-purpose software) by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

As used herein, a "database" is a data storage resource and may store data structured in any of various ways, for example, as a text file, a table, a spreadsheet, a relational database (e.g., an object-relational database), a triple store, a hierarchical data store, a document database, a graph database, key-value pairs, or any suitable combination thereof. Moreover, any two or more of the systems or machines discussed herein may be combined into a single system or machine, and the functions described herein for any single system or machine may be subdivided among multiple systems or machines.

As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

Any one or more of the components (e.g., modules) described herein may be implemented using hardware alone (e.g., one or more processors) or a combination of hardware and software. For example, any component described herein may physically include an arrangement of one or more processors configured to perform the operations described herein for that component. As another example, any component described herein may include software, hardware, or both, that configure an arrangement of one or more processors to perform the operations described herein for that component. Accordingly, different components described herein may include and configure different arrangements of processors at different points in time or a single arrangement of processors at different points in time. Each component (e.g., module) described herein is an example of a means for performing the operations described herein for that component. Moreover, any two or more components described herein may be combined into a single component, and the functions described herein for a single component may be subdivided among multiple components. Furthermore, according to various example embodiments, components described herein as being implemented within a single system or machine (e.g., a single device) may be distributed across multiple systems or machines (e.g., multiple devices).

Figure 5:
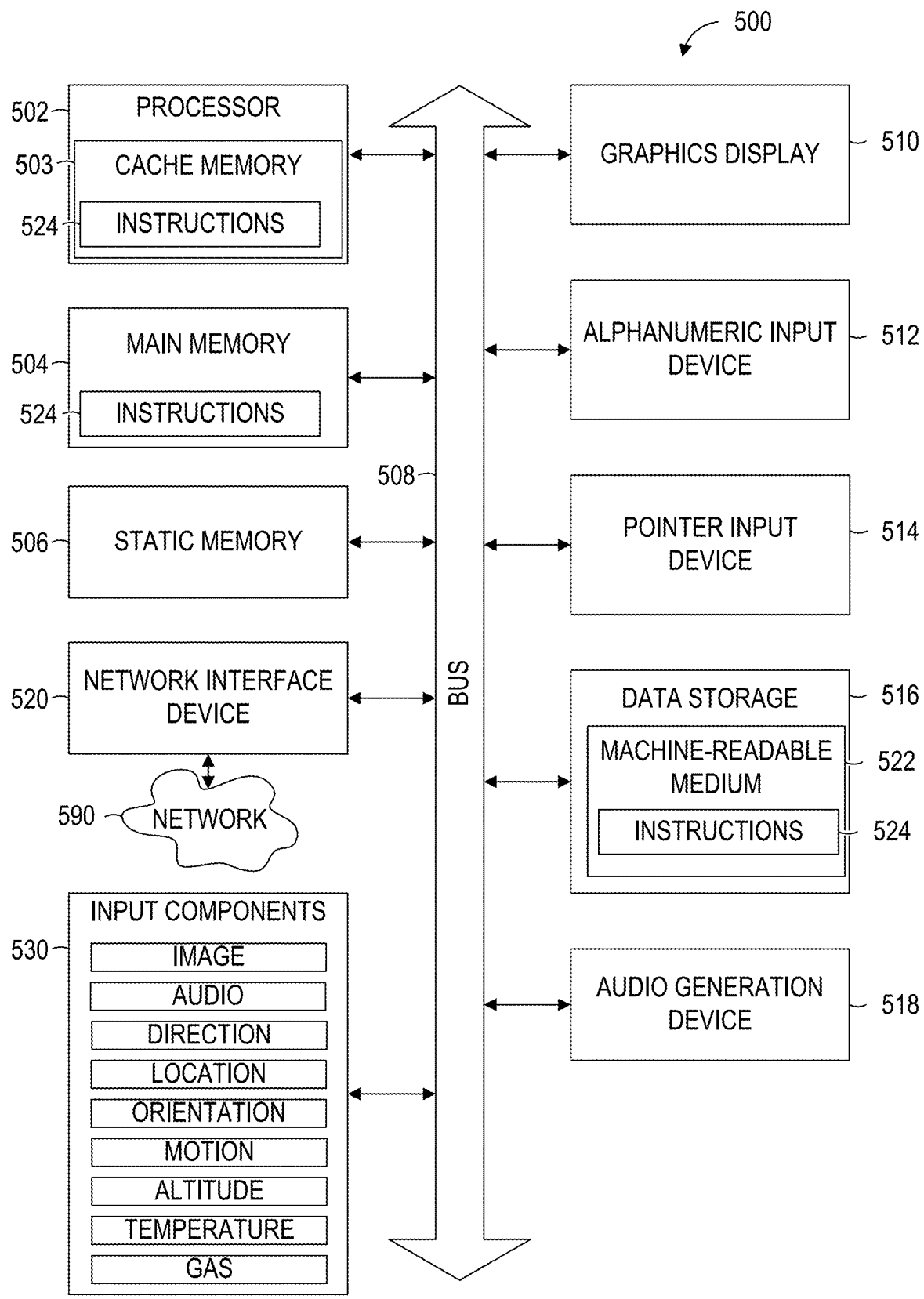
FIG. 5 is a block diagram illustrating components of a machine, according to some example embodiments, able to read instructions from a machine-readable medium and perform any one or more of the methodologies discussed herein.

FIG. 5 is a block diagram illustrating components of a machine 500, according to some example embodiments, able to read instructions 524 from a machine-readable medium 522 (e.g., a non-transitory machine-readable medium, a machine-readable storage medium, a computer-readable storage medium, or any suitable combination thereof) and perform any one or more of the methodologies discussed herein, in whole or in part. Specifically, FIG. 5 shows the machine 500 in the example form of a computer system (e.g., a computer) within which the instructions 524 (e.g., software, a program, an application, an applet, an app, or other executable code) for causing the machine 500 to perform any one or more of the methodologies discussed herein may be executed, in whole or in part.

In alternative embodiments, the machine 500 operates as a standalone device or may be communicatively coupled (e.g., networked) to other machines. In a networked deployment, the machine 500 may operate in the capacity of a server machine or a client machine in a server-client network environment, or as a peer machine in a distributed (e.g., peer-to-peer) network environment. The machine 500 may be a server computer, a client computer, a personal computer (PC), a tablet computer, a laptop computer, a netbook, a cellular telephone, a smart phone, a set-top box (STB), a personal digital assistant (PDA), a web appliance, a network router, a network switch, a network bridge, or any machine capable of executing the instructions 524, sequentially or otherwise, that specify actions to be taken by that machine. Further, while only a single machine is illustrated, the term "machine" shall also be taken to include any collection of machines that individually or jointly execute the instructions 524 to perform all or part of any one or more of the methodologies discussed herein.

The machine 500 includes a processor 502 (e.g., processor 102, which may be or include one or more central processing units (CPUs), one or more graphics processing units (GPUs), one or more digital signal processors (DSPs), one or more application specific integrated circuits (ASICs), one or more radio-frequency integrated circuits (RFICs), one or more tensor processing units (TPUs), one or more neural processing units (NPUs), one or more vision processing units (VPUs), one or more machine-learning accelerators, one or more artificial-intelligence accelerators, one or more neuromorphic processors, one or more quantum processors, or any suitable combination thereof), a main memory 504, and a static memory 506, which are configured to communicate with each other via a bus 508. The processor 502 contains solid-state digital microcircuits (e.g., electronic, optical, biological, or any suitable combination thereof) that are configurable, temporarily or permanently, by some or all of the instructions 524, some or all of which may be stored, temporarily or permanently, in a cache memory 503 (e.g., cache memory 103) onboard the processor 502 and managed by the processor 502, such that the processor 502 is configurable to perform any one or more of the methodologies described herein, in whole or in part. For example, a set of one or more microcircuits of the processor 502 may be configurable to execute one or more modules (e.g., software modules) described herein.

In some example embodiments, the processor 502 is a multicore CPU (e.g., a dual-core CPU, a quad-core CPU, an 8-core CPU, or a 128-core CPU) within which each of multiple cores behaves as a separate processor that is able to perform any one or more of the methodologies discussed herein, in whole or in part. Parallel processing on one or more multicore processors may be implemented via one or more suitable architectures, such as superscalar, very long instruction word (VLIW), vector processing, or single-instruction/multiple-data (SIMD), which allow each core to run separate instruction streams concurrently. A processor may be emulated in software, running on a physical processor, as a virtual processor or virtual circuit. The virtual processor may behave like an independent processor but is implemented in software rather than hardware. Although the beneficial effects described herein may be provided by the machine 500 with at least the processor 502, these same beneficial effects may be provided by a different kind of machine that contains no processors (e.g., a purely mechanical system, a purely hydraulic system, or a hybrid mechanical-hydraulic system), if such a processor-less machine is configured to perform one or more of the methodologies described herein.

The machine 500 may further include a graphics display 510 (e.g., a plasma display panel (PDP), a light emitting diode (LED) display, a liquid crystal display (LCD), a projector, a cathode ray tube (CRT), or any other display capable of displaying graphics or video). The machine 500 may also include an alphanumeric input device 512 (e.g., a keyboard or keypad), a pointer input device 514 (e.g., a mouse, a touchpad, a touchscreen, a trackball, a joystick, a stylus, a motion sensor, an eye tracking device, a data glove, or other pointing instrument), a data storage 516, an audio generation device 518 (e.g., a sound card, an amplifier, a speaker, a headphone jack, or any suitable combination thereof), and a network interface device 520.

The data storage 516 (e.g., a data storage device) includes the machine-readable medium 522 (e.g., a tangible and non-transitory machine-readable storage medium) on which are stored the instructions 524 embodying any one or more of the methodologies or functions described herein. The instructions 524 may also reside, completely or at least partially, within the main memory 504, within the static memory 506, within the processor 502 (e.g., within the processor's cache memory 503), or any suitable combination thereof, before or during execution thereof by the machine 500. Accordingly, the cache memory 503, the main memory 504, the static memory 506, and the processor 502 may be considered machine-readable media (e.g., tangible and non-transitory machine-readable media). The instructions 524 may be transmitted or received over a network 590 via the network interface device 520. For example, the network interface device 520 may communicate the instructions 524 using any one or more transfer protocols (e.g., hypertext transfer protocol (HTTP)).

In some example embodiments, the machine 500 may be a portable computing device (e.g., a smart phone, a tablet computer, or a wearable device) and may have one or more additional input components 530 (e.g., sensors or gauges). Examples of such input components 530 include an image input component (e.g., one or more cameras), an audio input component (e.g., one or more microphones), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), a temperature input component (e.g., a thermometer), and a gas detection component (e.g., a gas sensor). Input data gathered by any one or more of these input components 530 may be accessible and available for use by any of the modules described herein (e.g., with suitable privacy notifications and protections, such as opt-in consent or opt-out consent, implemented in accordance with user preference, applicable regulations, or any suitable combination thereof).

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 522 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of carrying (e.g., storing or communicating) the instructions 524 for execution by the machine 500, such that the instructions 524, when executed by one or more processors of the machine 500 (e.g., processor 502), cause the machine 500 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible and non-transitory data repositories (e.g., data volumes) in the example form of a solid-state memory chip, an optical disc, a magnetic disc, or any suitable combination thereof.

A "non-transitory" machine-readable medium, as used herein, specifically excludes propagating signals per se. According to various example embodiments, the instructions 524 for execution by the machine 500 can be communicated via a carrier medium (e.g., a machine-readable carrier medium). Examples of such a carrier medium include a non-transient carrier medium (e.g., a non-transitory machine-readable storage medium, such as a solid-state memory that is physically movable from one place to another place) and a transient carrier medium (e.g., a carrier wave or other propagating signal that communicates the instructions 524).

Certain example embodiments may be described herein as including modules. Modules may constitute software modules (e.g., code stored or otherwise embodied in a machine-readable medium or in a transmission medium), hardware modules, or any suitable combination thereof. A "hardware module" is a tangible (e.g., non-transitory) physical component (e.g., a set of one or more processors) capable of performing certain operations and may be configured or arranged in a certain physical manner. In various example embodiments, one or more computer systems or one or more hardware modules thereof may be configured by software (e.g., an application or portion thereof) as a hardware module that operates to perform operations described herein for that module.

In some example embodiments, a hardware module may be implemented mechanically, electronically, hydraulically, or any suitable combination thereof. For example, a hardware module may include dedicated circuitry or logic that is permanently configured to perform certain operations. A hardware module may be or include a special-purpose processor, such as a field programmable gate array (FPGA) or an ASIC. A hardware module may also include programmable logic or circuitry that is temporarily configured by software to perform certain operations. As an example, a hardware module may include software encompassed within a CPU or other programmable processor. It will be appreciated that the decision to implement a hardware module mechanically, hydraulically, in dedicated and permanently configured circuitry, or in temporarily configured circuitry (e.g., configured by software) may be driven by cost and time considerations.

Accordingly, the phrase "hardware module" should be understood to encompass a tangible entity that may be physically constructed, permanently configured (e.g., hardwired), or temporarily configured (e.g., programmed) to operate in a certain manner or to perform certain operations described herein. Furthermore, as used herein, the phrase "hardware-implemented module" refers to a hardware module. Considering example embodiments in which hardware modules are temporarily configured (e.g., programmed), each of the hardware modules need not be configured or instantiated at any one instance in time. For example, where a hardware module includes a CPU configured by software to become a special-purpose processor, the CPU may be configured as respectively different special-purpose processors (e.g., each included in a different hardware module) at different times. Software (e.g., a software module) may accordingly configure one or more processors, for example, to become or otherwise constitute a particular hardware module at one instance of time and to become or otherwise constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory (e.g., a memory device) to which it is communicatively coupled. A further hardware module may then, at a later time, access the memory to retrieve and process the stored output. Hardware modules may also initiate communications with input or output devices, and can operate on a resource (e.g., a collection of information from a computing resource).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module in which the hardware includes one or more processors. Accordingly, the operations described herein may be at least partially processor-implemented, hardware-implemented, or both, since a processor is an example of hardware, and at least some operations within any one or more of the methods discussed herein may be performed by one or more processor-implemented modules, hardware-implemented modules, or any suitable combination thereof.

Moreover, such one or more processors may perform operations in a "cloud computing" environment or as a service (e.g., within a "software as a service" (SaaS) implementation). For example, at least some operations within any one or more of the methods discussed herein may be performed by a group of computers (e.g., as examples of machines that include processors), with these operations being accessible via a network (e.g., the Internet) and via one or more appropriate interfaces (e.g., an application program interface (API)). The performance of certain operations may be distributed among the one or more processors, whether residing only within a single machine or deployed across a number of machines. In some example embodiments, the one or more processors or hardware modules (e.g., processor-implemented modules) may be located in a single geographic location (e.g., within a home environment, an office environment, or a server farm). In other example embodiments, the one or more processors or hardware modules may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and their functionality presented as separate components and functions in example configurations may be implemented as a combined structure or component with combined functions. Similarly, structures and functionality presented as a single component may be implemented as separate components and functions. These and other variations, modifications, additions, and improvements fall within the scope of the subject matter herein.

Some portions of the subject matter discussed herein may be presented in terms of algorithms or symbolic representations of operations on data stored as bits or binary digital signals within a memory (e.g., a computer memory or other machine memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "accessing," "processing," "detecting," "computing," "calculating," "determining," "generating," "presenting," "displaying," or the like refer to actions or processes performable by a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The following enumerated descriptions describe various examples of methods, machine-readable media, and systems (e.g., machines, devices, or other apparatus) discussed herein. Any one or more features of an example, taken in isolation or combination, should be considered as being within the disclosure of this application.

A first example provides a method comprising:
  detecting, by a processor, a request from an application to store a first data record into a cache memory of the processor, the request including the first data record and a corresponding first weight specified for the first data record by the application;
  writing, by the processor, the first data record and its corresponding first weight into the cache memory of the processor;
  calculating, by the processor, a first score of the first data record based on a first ratio of a first idle time since the first data record was last accessed to the corresponding first weight specified by the application;
  comparing, by the processor, the first score of the first data record to a second score of a second data record stored in the cache memory of the processor, the second score being calculated based on a second ratio of a second idle time since the second data record was last accessed to a corresponding second weight; and
  deleting, by the processor, the first data record from the cache memory of the processor based on the comparing of the first score of the first data record to the second score of the second data record stored in the cache memory of the processor.

A second example provides a method according to the first example, wherein:
  the deleting of the first data record is based on the first ratio that corresponds to the first data record exceeding the second ratio that corresponds to the second data record.

A third example provides a method according to the first example or the second example, wherein:
  the first weight is specified by the application based on a first size of the first data record; and
  the calculating of the first score is based on the first ratio of the first idle time to the first weight specified based on the first size of the first data record.

A fourth example provides a method according to the third example, further comprising:
  comparing a maximum weight to the first weight specified by the application based on the first size of the first data record; and wherein:
  the calculating of the first score is based on the first weight failing to exceed the maximum weight.

A fifth example provides a method according to the third example or the fourth example, further comprising:
  quantizing the first weight specified by the application based on the first size of the first data record; and wherein:
  the calculating of the first score is based on the first ratio of the first idle time to the quantized first weight.

A sixth example provides a method according to any of the first through fifth examples, wherein:
  the first weight is specified by the application based on a first data category of the first data record among a plurality of data categories; and
  the calculating of the first score is based on the first ratio of the first idle time to the first weight specified based on the first data category of the first data record.

A seventh example provides a method according to any of the first through sixth examples, wherein:
  the first weight specified by the application is a positive integer value; and
  the calculating of the first score is based on the first ratio of the first idle time to the positive integer value.

An eighth example provides a method according to any of the first through seventh examples, wherein:
  the comparing of the first score of the first data record to the second score of the second data record is responsive to a detection that an available storage capacity of the cache memory is below a threshold value.

A ninth example provides a method comprising:
  detecting, by a processor, a request from an application to store a first data record into a cache memory of the processor, the request including the first data record and a corresponding first weight specified for the first data record by the application;
  writing, by the processor, the first data record and its corresponding first weight into the cache memory of the processor;
  calculating, by the processor, a first score of the first data record based on a first product of a first access frequency of the first data record times the corresponding first weight specified by the application;
  comparing, by the processor, the first score of the first data record to a second score of a second data record stored in the cache memory of the processor, the second score being calculated based on a second product of a second access frequency of the second data record times a corresponding second weight; and
  deleting, by the processor, the first data record from the cache memory of the processor based on the comparing of the first score of the first data record to the second score of the second data record stored in the cache memory of the processor.

A tenth example provides a method according to the ninth example, wherein:
  the deleting of the first data record is based on the second product that corresponds to the second data record exceeding the first product that corresponds to the first data record.

An eleventh example provides a method according to the ninth example or the tenth example, wherein:
  the first weight is specified by the application based on a first size of the first data record; and
  the calculating of the first score is based on the first product of the first access frequency times the first weight specified based on the first size of the first data record.

A twelfth example provides a method according to the eleventh example, further comprising:
  comparing a maximum weight to the first weight specified by the application based on the first size of the first data record; and wherein:
  the calculating of the first score is based on the first weight failing to exceed the maximum weight.

The thirteenth example provides a method according to the eleventh example or the twelfth example, further comprising:
  quantizing the first weight specified by the application based on the first size of the first data record; and wherein:
  the calculating of the first score is based on the first product of the first access frequency times the quantized first weight.

A fourteenth example provides a method according to any of the ninth through thirteenth examples, wherein:
  the first weight is specified by the application based on a first data category of the first data record among a plurality of data categories; and
  the calculating of the first score is based on the first product of the first access frequency times the first weight specified based on the first data category of the first data record.

A fifteenth example provides a method according to any of the ninth through fourteenth examples, wherein:
  the first weight specified by the application is a positive integer value; and
  the calculating of the first score is based on the first product of the first access frequency times the positive integer value.

A sixteenth example provides a method according to any of the ninth through fifteenth examples, wherein:
  the comparing of the first score of the first data record to the second score of the second data record is responsive to a detection that an available storage capacity of the cache memory is below a threshold value.

A seventeenth example provides a processor (e.g., a multi-core microprocessor, a single-core microprocessor, or other hardware processor) comprising instructions that, when executed by the processor, cause the processor to perform operations comprising:
  detecting a request from an application to store a first data record into a cache memory of the processor, the request including the first data record and a corresponding first weight specified for the first data record by the application;
  writing the first data record and its corresponding first weight into the cache memory of the processor;
  calculating a first score of the first data record based on a first ratio of a first idle time since the first data record was last accessed to the corresponding first weight specified by the application;

comparing the first score of the first data record to a second score of a second data record stored in the cache memory of the processor, the second score being calculated based on a second ratio of a second idle time since the second data record was last accessed to a corresponding second weight; and deleting the first data record from the cache memory of the processor based on the comparing of the first score of the first data record to the second score of the second data record stored in the cache memory of the processor.

An eighteenth example provides a processor according to the seventeenth example, wherein:

the deleting of the first data record is based on the first ratio that corresponds to the first data record exceeding the second ratio that corresponds to the second data record.

A nineteenth example provides a processor according to the seventeenth example or the eighteenth example, wherein:

the first weight is specified by the application based on a first size of the first data record; and the calculating of the first score is based on the first ratio of the first idle time to the first weight specified based on the first size of the first data record.

A twentieth example provides a processor according to any of the seventeenth through nineteenth examples, wherein the operations further comprise:

quantizing the first weight specified by the application based on the first size of the first data record; and wherein:

the calculating of the first score is based on the first ratio of the first idle time to the quantized first weight.

A twenty-first example provides a carrier medium carrying machine-readable instructions for controlling a machine to carry out the operations (e.g., method operations) performed in any one of the previously described examples.

What is claimed is:

1. A processor comprising instructions that, when executed by the processor, cause the processor to perform operations comprising:

detecting a request to store a first data record into a cache memory of the processor, the request including the first data record and a corresponding first weight specified for the first data record;

writing the first data record and its corresponding first weight into the cache memory of the processor;

calculating a first score of the first data record based on a first ratio of a first idle time since the first data record was last accessed to the corresponding first weight;

comparing the first score of the first data record to a second score of a second data record stored in the cache memory of the processor, the second score being calculated based on a second ratio of a second idle time since the second data record was last accessed to a corresponding second weight; and deleting the first data record from the cache memory of the processor based on the comparing of the first score of the first data record to the second score of the second data record stored in the cache memory of the processor.

2. The processor of claim 1, wherein:

the deleting of the first data record is based on the first ratio that corresponds to the first data record exceeding the second ratio that corresponds to the second data record.

3. The processor of claim 1, wherein:

the first weight is specified by an application based on a first size of the first data record; and the calculating of the first score is based on the first ratio of the first idle time to the first weight specified based on the first size of the first data record.

4. The processor of claim 3, wherein the operations further comprise:

comparing a maximum weight to the first weight specified by the application based on the first size of the first data record; and wherein:

the calculating of the first score is based on the first weight failing to exceed the maximum weight.

5. The processor of claim 3, wherein the operations further comprise:

quantizing the first weight specified by the application based on the first size of the first data record; and wherein:

the calculating of the first score is based on the first ratio of the first idle time to the quantized first weight.

6. The processor of claim 1, wherein:

the first weight is specified by an application based on a first data category of the first data record among a plurality of data categories; and the calculating of the first score is based on the first ratio of the first idle time to the first weight specified based on the first data category of the first data record.

7. The processor of claim 1, wherein:

the first weight is a positive integer value; and the calculating of the first score is based on the first ratio of the first idle time to the positive integer value.

8. The processor of claim 1, wherein:

the comparing of the first score of the first data record to the second score of the second data record is responsive to a detection that an available storage capacity of the cache memory is below a threshold value.

9. A processor comprising instructions that, when executed by the processor, cause the processor to perform operations comprising:

detecting a request to store a first data record into a cache memory of the processor, the request including the first data record and a corresponding first weight specified for the first data record;

writing the first data record and its corresponding first weight into the cache memory of the processor;

calculating a first score of the first data record based on a first product of a first access frequency of the first data record times the corresponding first weight;

comparing the first score of the first data record to a second score of a second data record stored in the cache memory of the processor, the second score being calculated based on a second product of a second access frequency of the second data record times a corresponding second weight; and deleting the first data record from the cache memory of the processor based on the comparing of the first score of the first data record to the second score of the second data record stored in the cache memory of the processor.

10. The processor of claim 9, wherein:

the deleting of the first data record is based on the second product that corresponds to the second data record exceeding the first product that corresponds to the first data record.

11. The processor of claim 9, wherein:

the first weight is specified by an application based on a first size of the first data record; and the calculating of the first score is based on the first product of the first access frequency times the first weight specified based on the first size of the first data record.

12. The processor of claim 11, wherein the operations further comprise:
comparing a maximum weight to the first weight specified by the application based on the first size of the first data record; and wherein:
the calculating of the first score is based on the first weight failing to exceed the maximum weight.

13. The processor of claim 11, wherein the operations further comprise:
quantizing the first weight specified by the application based on the first size of the first data record; and wherein:
the calculating of the first score is based on the first product of the first access frequency times the quantized first weight.

14. The processor of claim 9, wherein:
the first weight is specified by an application based on a first data category of the first data record among a plurality of data categories; and
the calculating of the first score is based on the first product of the first access frequency times the first weight specified based on the first data category of the first data record.

15. The processor of claim 9, wherein:
the first weight is a positive integer value; and
the calculating of the first score is based on the first product of the first access frequency times the positive integer value.

16. The processor of claim 9, wherein:
the comparing of the first score of the first data record to the second score of the second data record is responsive to a detection that an available storage capacity of the cache memory is below a threshold value.

17. A method comprising:
detecting, by a processor, a request to store a first data record into a cache memory of the processor, the request including the first data record and a corresponding first weight specified for the first data record;
writing, by the processor, the first data record and its corresponding first weight into the cache memory of the processor;
calculating, by the processor, a first score of the first data record based on a first ratio of a first idle time since the first data record was last accessed to the corresponding first weight;
comparing, by the processor, the first score of the first data record to a second score of a second data record stored in the cache memory of the processor, the second score being calculated based on a second ratio of a second idle time since the second data record was last accessed to a corresponding second weight; and
deleting, by the processor, the first data record from the cache memory of the processor based on the comparing of the first score of the first data record to the second score of the second data record stored in the cache memory of the processor.

18. The method of claim 17, wherein:
the deleting of the first data record is based on the first ratio that corresponds to the first data record exceeding the second ratio that corresponds to the second data record.

19. The method of claim 17, wherein:
the first weight is specified by an application based on a first size of the first data record; and
the calculating of the first score is based on the first ratio of the first idle time to the first weight specified based on the first size of the first data record.

20. The method of claim 19, further comprising:
comparing a maximum weight to the first weight specified by the application based on the first size of the first data record; and wherein:
the calculating of the first score is based on the first weight failing to exceed the maximum weight.

* * * * *